(12) United States Patent
McCammon

(10) Patent No.: US 9,253,450 B2
(45) Date of Patent: Feb. 2, 2016

(54) TOTAL BUS SURVEILLANCE SYSTEM

(71) Applicant: Jon McCammon, Costa Mesa, CA (US)

(72) Inventor: Jon McCammon, Costa Mesa, CA (US)

(73) Assignee: UTC FIRE & SECURITY AMERICAS CORPORATION, INC., Bradenton, FL (US)

( * ) Notice: Subject to any disclaimer, the term of this patent is extended or adjusted under 35 U.S.C. 154(b) by 375 days.

(21) Appl. No.: 13/861,138

(22) Filed: Apr. 11, 2013

(65) Prior Publication Data

US 2013/0278770 A1    Oct. 24, 2013

Related U.S. Application Data

(60) Provisional application No. 61/625,989, filed on Apr. 18, 2012.

(51) Int. Cl.
*B60R 1/00* (2006.01)
*H04N 7/18* (2006.01)

(52) U.S. Cl.
CPC . *H04N 7/18* (2013.01); *H04N 7/181* (2013.01)

(58) Field of Classification Search
CPC ....................................................... B60R 1/00
USPC ......................................................... 348/148
See application file for complete search history.

(56) References Cited

U.S. PATENT DOCUMENTS

| | | | |
|---|---|---|---|
| 5,105,285 A * | 4/1992 | Miyata | G06F 3/02 358/449 |
| 7,876,360 B2 | 1/2011 | Arakawa et al. | |
| 8,009,200 B2 | 8/2011 | Goh | |
| 8,069,465 B1 * | 11/2011 | Bartholomay | H04L 47/14 370/395.4 |
| 2006/0158509 A1 | 7/2006 | Kenoyer et al. | |
| 2011/0157418 A1 | 6/2011 | Raynor et al. | |
| 2011/0242342 A1 | 10/2011 | Goma et al. | |

* cited by examiner

*Primary Examiner* — Jefferey Harold
*Assistant Examiner* — Sihar Karwan
(74) *Attorney, Agent, or Firm* — Cantor Colburn LLP

(57) ABSTRACT

A synchronized video monitoring system may include a plurality of separate sensor modules that each include a lens assembly, an image sensor, and a sensor controller. Each sensor module may be connected to a data bus. A collection module that includes a digital image compressor engine may also be connected to the data bus. Each sensor module may capture an image of a field of view of a monitored area. Each sensor module may insert its image data onto the data bus within a different allotment of time within a frame capture cycle. The collection module may compress and encode the image data received from each sensor module, and may generate a composite video image frame. Each region of the composite video image frame may depict image data captured by a different sensor module.

20 Claims, 4 Drawing Sheets

TOTAL BUS SURVEILLANCE SYSTEM

This application claims the benefit of Provisional U.S. Patent Application No. 61/625,989, filed Apr. 18, 2012, which is incorporated herein by reference in its entirety.

TECHNICAL FIELD

The present disclosure relates generally to methods, systems, and computer-readable media for monitoring physical spaces using a multi-sensor camera system.

BACKGROUND

Video cameras may be used to monitor various areas, such as the interior of a building or vehicle. In some cases, if the interior of the building or vehicle is sufficiently large, and there is a desire to monitor a large portion of the interior, it may be necessary to install multiple video cameras, such that different cameras are tasked with monitoring different sections of the interior.

However, multi-camera systems typically pose several challenges for video monitoring over single-camera systems. For example, if each camera in a multi-camera monitoring system records footage on a separate computer-readable medium, it may be necessary for personnel to review the footage of each camera separately in order to adequately analyze the entire monitored interior. Moreover, multi-camera systems may pose significant additional expenses for an organization, since each individual camera may be costly to purchase or maintain.

Accordingly, video monitoring systems may be improved by techniques for capturing video footage of multiple areas of an interior without the need for separate, fully functional and independent cameras.

SUMMARY

The present disclosure addresses these and other improvements to video monitoring systems. In some embodiments, a synchronized video monitoring system may include a plurality of separate sensor modules that each include a lens assembly, an image sensor, and a sensor controller. Each sensor module may be connected to a data bus. A collection module that includes a digital image compressor engine may also be connected to the data bus. Each sensor module may capture an image of a field of view of a monitored area. Each sensor module may insert its image data onto the data bus within a different allotment of time within a frame capture cycle. The collection module may compress and encode the image data received from each sensor module, and may generate a composite video image frame. Each region of the composite video image frame may depict image data captured by a different sensor module. Thus, a simplified and more cost-effective architecture may be used for each sensor module in order to monitor multiple portions of a physical area without the need for separate, fully functional video cameras at each monitoring location and without the need for potentially complicated harmonization of different video feeds captured and stored by different, fully functional video cameras.

Additional objects, advantages, and embodiments of the present disclosure will be set forth in part in the description that follows, and in part will be derived from the description, or may be learned by practice of the disclosed embodiments. The objects, advantages, and embodiments of the present disclosure will be realized and attained by means of the elements and combinations particularly pointed out in the appended claims. It is to be understood that both the foregoing general description and the following detailed description are exemplary and explanatory only and are not restrictive of the present disclosure, as claimed. It is also to be understood that use of the word "exemplary" throughout the application is to be understood as providing examples that may be useful for illustrating general principles or concepts; thus, figures and descriptions identified as "exemplary" should not be interpreted as representing the best or only approaches to practicing the disclosed embodiments.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
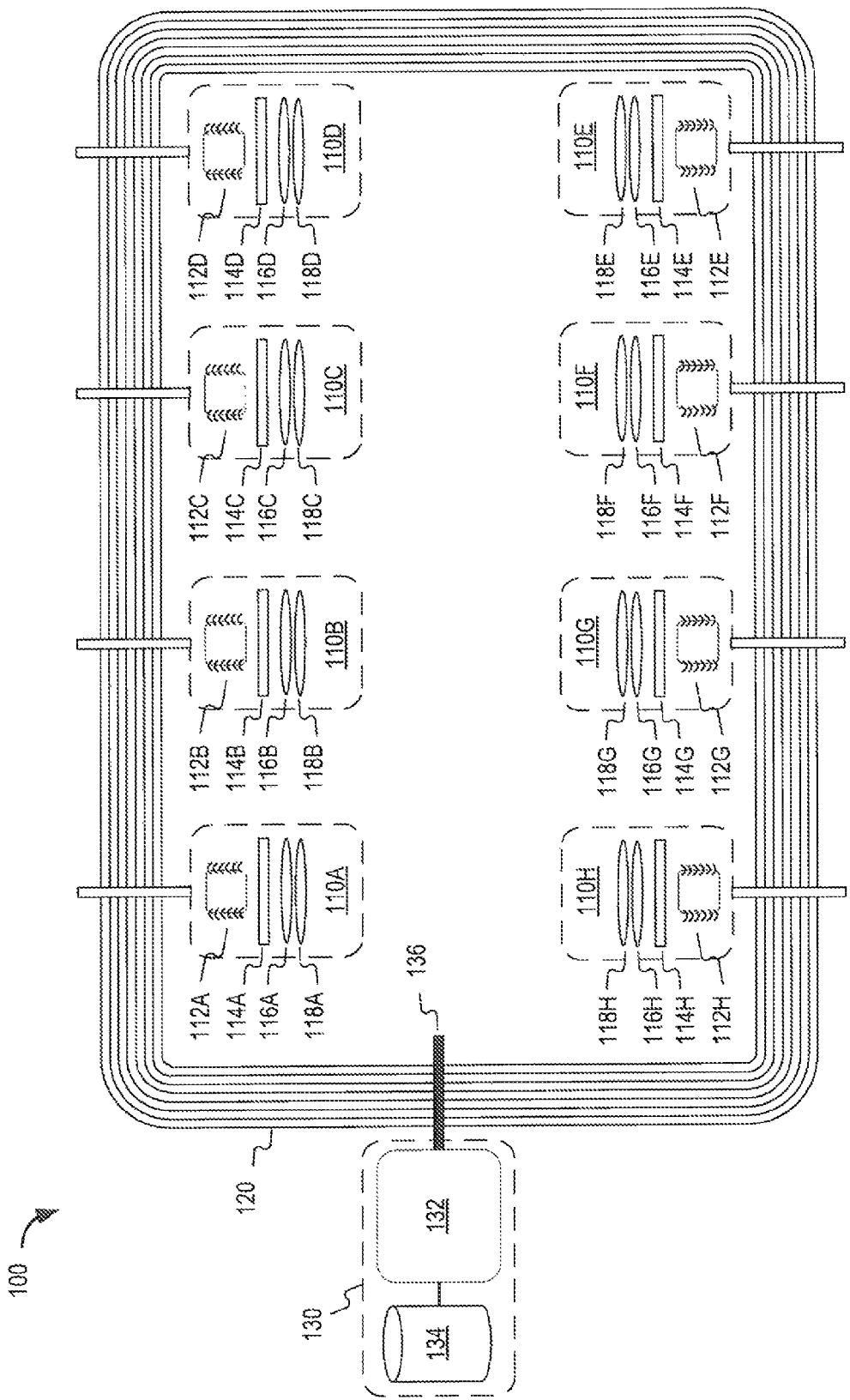
FIG. 1 is a diagram depicting an exemplary hardware configuration for a synchronized, multi-sensor video monitoring system, consistent with certain disclosed embodiments.

The following detailed description refers to the accompanying drawings. Wherever convenient, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

As depicted in FIG. 1 a synchronized, multi-sensor video monitoring system 100 (hereinafter, "system 100") may include a plurality of sensor modules 110*a*-110*h* serially arranged on a data bus 120. Each sensor module 110 may include a focal lens 118, for focusing light that enters the sensor module assembly; a defractor lens 116, for separating visible light waves from infrared waves; an image sensor 114 for converting detected light into digital image information; and a sensor controller 112 for inserting the digital image information onto data bus 120. Data bus 120 may be configured to operate at a specified bus speed—for example, 54 MHz.

in some embodiments, sensor controller 112 may be a field-programmable gate array (FPGA) programmed to modify digital image information received from an image sensor 114 and to insert the modified digital information onto data bus 120 in accordance with one or more of the below-described techniques. In other embodiments, a sensor controller 112 may be a central processing unit (CPU) or an application-specific integrated circuit (ASIC).

System 100 may also include a collection module 130 for collecting digital image information inserted onto data bus 120 by sensor sensor controllers 112a-112h. Collection module 130 may include a compressor engine 132, a data store 134, and a bus terminator 136 to prevent feedback on data bus 120.

Typically, a fully functional digital camera will include a compressor engine behind an image sensor. The compressor engine may act essentially as CPU by collecting image data from the image sensor, compressing the image data, and generating digitally formatted images based on the image data. However, as depicted in FIG. 1, sensor modules 110 may be distinguished from fully functional and independent digital cameras by virtue of not including individual compressor engines. Rather, system 100 may include only a single compressor engine 132 that services each of sensor modules 110a-110h.

Figure 2:
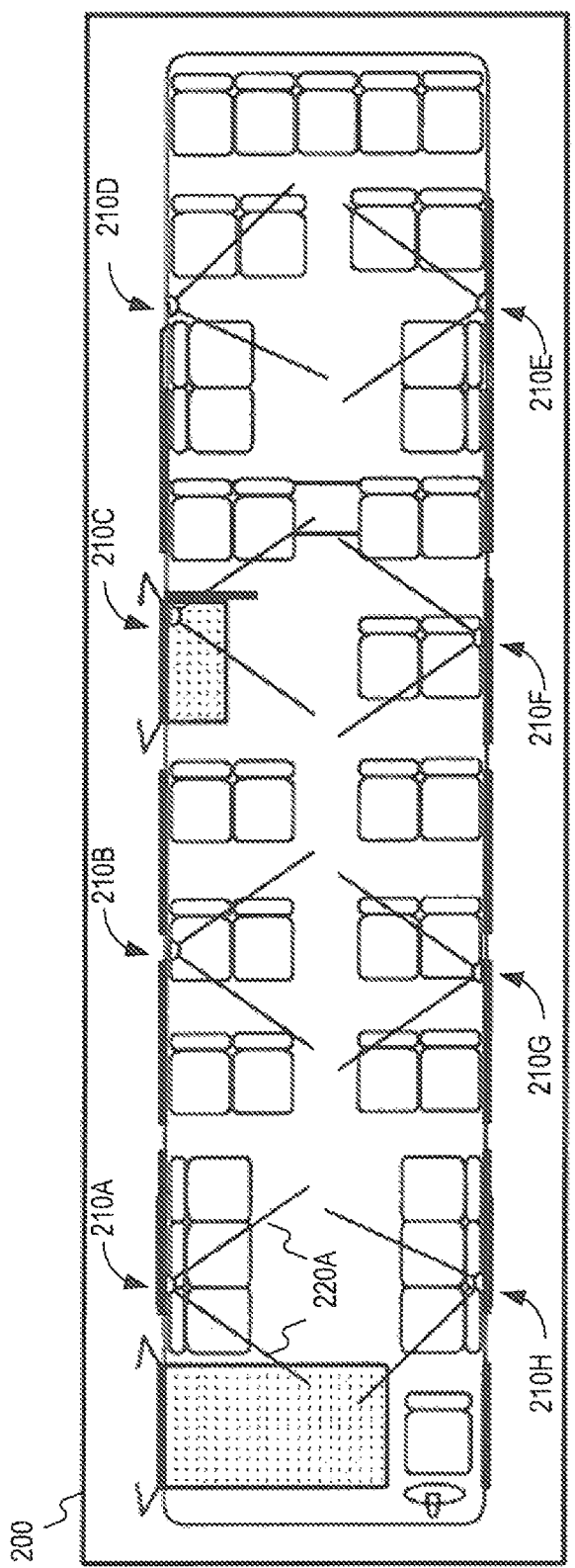
FIG. 2 is a diagram depicting an exemplary application of a synchronized, multi-sensor video monitoring system to monitor the interior of a vehicle bus, consistent with certain disclosed embodiments.

System 100 may be used to monitor any physical area, such as the interior of a building or vehicle, such as a passenger bus, train, or other kind of moving platform. For example, as depicted in FIG. 2, system 100 may be utilized within a vehicle bus 200 (hereinafter "vehicle 200") censor modules 110a-110h may be placed at different locations 210a-210h within vehicle 200 such that they are able to monitor different portions of the interior of vehicle 200. For example, sensor module 110a may be placed at location 210a within vehicle 200, which provides sensor module 110a with a field of view 220a.

Figure 3:
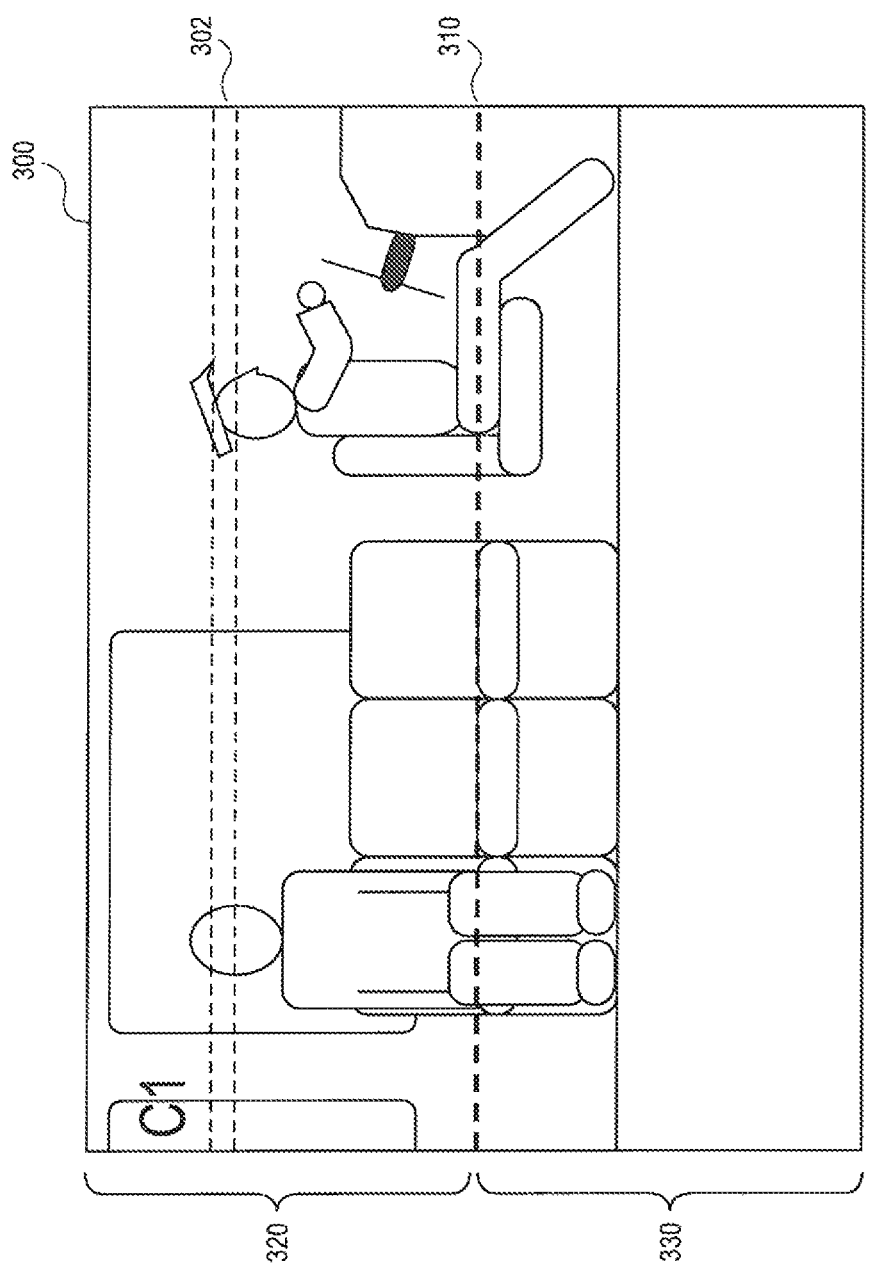
FIG. 3 is a diagram depicting an exemplary image frame that may be captured by an individual sensor within a synchronized, multi-sensor video monitoring system, consistent with certain disclosed embodiments.

In some embodiments, each sensor module 110 may capture image data representing the field of view associated with its location 210. For example, image 300, as depicted in FIG. 3, may represent image data that may be captured by sensor module 110a from position 210a. However, rather than capturing a separate collection of images from each sensor module 110, system 100 may be configured to collect a series of composite images in which each region of the composite image is constructed using image data from a separate sensor module 110.

Figure 4:
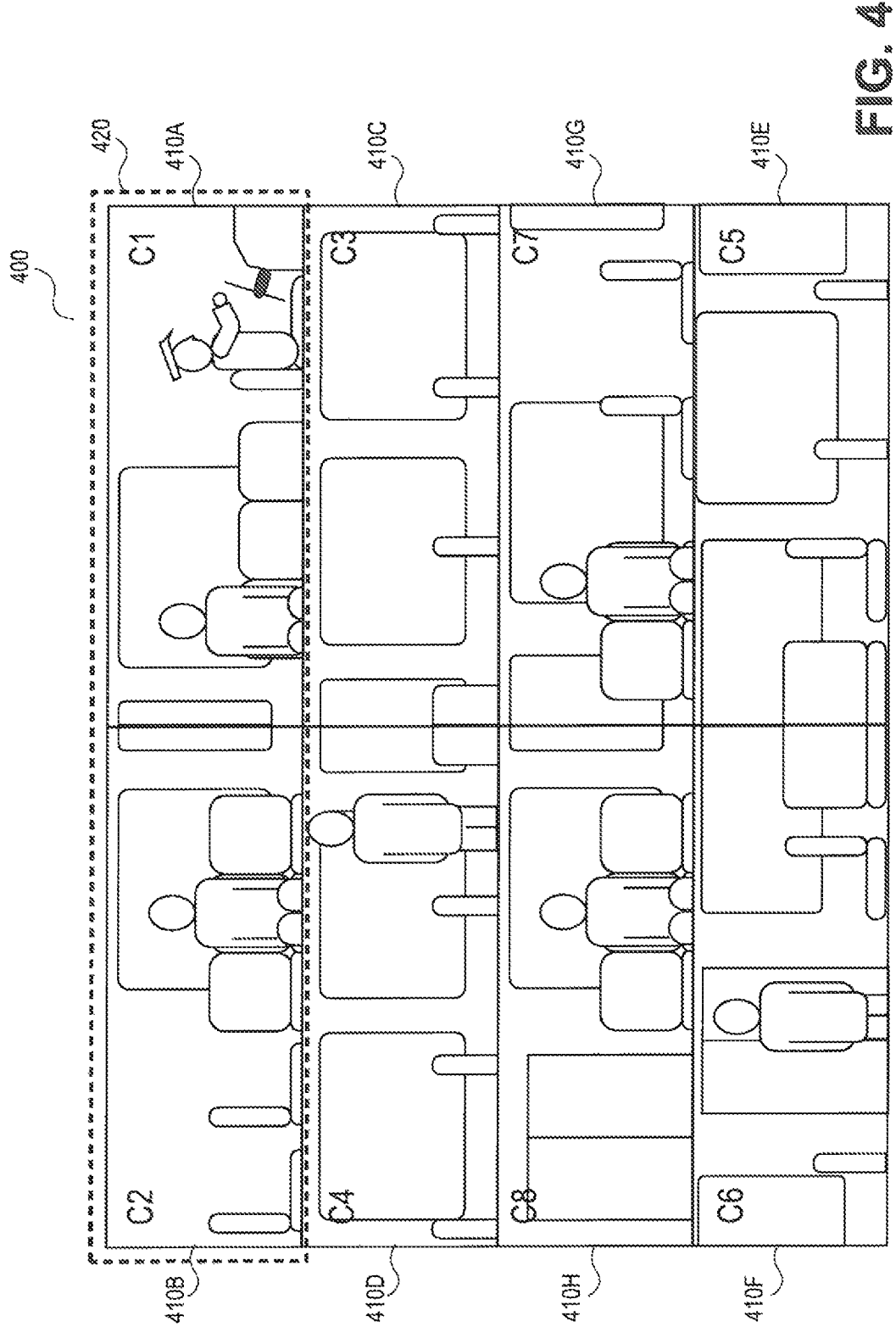
FIG. 4 is a diagram depicting an exemplary composite image captured by a synchronized, multi sensor video monitoring system, consistent with certain disclosed embodiments.

For example, as depicted in FIG. 4, a composite image 400 may include eight separate regions 410a-410h. Each separate region 410a-410h may represent image data collected from a corresponding sensor module 110a-110h. As can be seen, composite image 400 represents image data associated with the field of view of each location 210a-210h, such that all or a substantial portion of the interior of vehicle 200 is captured in a single composite image.

System 100 may capture a new composite image 400 of the interior of vehicle 200 according to any kind of periodicity, such as 15 frames per second ("fps"), and may store each such composite image 400 in data store 134. Together, the collected composite images 400 may be displayed in series on a display device to represent video footage of the interior of vehicle 200.

In some embodiments, composite image 400 may be constructed in the following manner. A first sensor module—e.g., sensor module 110a may operate as the controller for other sensor modules 110b-110h. Sensor module 110a may initiate a frame capture sequence by capturing image data corresponding to its location 210a and field of view 220a using focal lens 118a, detractor lens 116a, and image sensor 114a. Sensor controller 112a may then insert the image data generated by image sensor 114a onto data bus 120.

After sensor module 110a has completed inserting its image data onto data bus 120, sensor module 1101a may insert its image data onto data bus 120, followed by sensor modules 110c-110h, respectively. Each sensor module 110 may capture image data during its assigned "turn" to insert image data onto bus 120. Or, each sensor module 110 may capture image data at an earlier time and may temporarily store such image data into memory (e.g., within its sensor controller 112) until it is time for the image data to be inserted onto data bus 120.

Image data from each sensor module 110 may ultimately be collected by collection module 130. Within collection module 130, compressor engine 132 may compress, encode, and/or format the image data received from each sensor module 110 to generate a composite image 400 in a specified image format, such as a Joint Photographic Experts Group (JPEG), Graphics Interchange Format (GIF), or other image format. In some embodiments, composite image 400 may be formatted as a high definition image frame for use in high definition video—for example, using the BT.1120 format.

In some embodiments, the resolution of the resulting composite image 400 may depend on relationships between the number of frames captured per second, the amount of image data inserted onto the data bus 120 by each sensor module 110, the speed of data bus 120, and/or other factors. For example, assuming a data bus speed of 54 MHz, system 100 might be able to capture about 15 frames per second, each frame representing a 1440×960-pixel high definition composite image 400. Thus, each region 410 of composite image 400 might represent a 720×240-pixel image from an individual sensor module 110.

Sensor modules 110 may be configured to provide constituent 720×240-pixel images using a variety of techniques. In some embodiments, sensor modules 110 may be specially designed such that they each capture image data representing a 720×240-pixel image with each image capture. For example, image sensors 112 may be constructed so as to capture only enough data to comprise a 720×240-pixel image.

In other embodiments, sensor modules 110 may be configured or constructed to capture larger or higher resolution images, and sensor controllers 112 may be programmed to select only a subset of the captured image data in accordance with the desired resolution of the composite image 400, the number of frames to be captured per second, the data bus speed, and/or other factors. For example, a sensor module 110 may be constructed to capture 720×480-pixel images. However, in order to produce a composite image 400 of only 1440×960 pixels, half of the sensor module's collected image data may need to be discarded.

Moreover, because the bandwidth of data bus 120 may be limited to a certain word size, any image data larger than the word size would need to be inserted onto the bus serially. For example, assuming a 32-bit data bus 120, image data from a sensor module 110 could be inserted onto data bus 120 only 4 bytes at a time. Further assuming a video rate of 15 fps, each sensor would have approximately 8.3 milliseconds to insert the image data representing its associated region 410a-410h of composite image 400 onto data bus 120 during each frame capture cycle. The speed of data bus 120 (e.g., 54 MHz) thus imposes a limit on how much image data each sensor module 110 could insert onto data bus 120 (e.g., 4 bytes at a time) within its allotted 8.3 milliseconds.

In this example, each sensor module 110 could be configured to impose a customized blanking on its captured image data. For example, as depicted in FIG. 3, sensor module 110a may capture a 720×480-pixel image 300 of the interior of vehicle 200. Image 300 may be represented by image data comprising a series of consecutive rows of pixels (hereinafter "rasters"). In FIG. 3, an exemplary raster 302 is represented in exaggerated form for purposes of illustration.

Sensor controller 112a in sensor module 110a may be programmed to impose a cut-offline 310 so as to divide image 300 into a top region 320 (of dimensions 740×240 pixels) and a bottom region 330 (of dimensions 740×240 pixels). During a frame capture cycle, sensor controller 112a may insert data onto data bus 120 representing consecutive rasters 302 of image 300, starting from the top of image 300 until line 310 is reached. At that point, sensor control 112a may cease inserting data onto data bus 120, and responsibility may pass to a subsequent sensor module (e.g., sensor module 110b) to insert its image data onto data bus 120.

In this manner, each sensor controller 112a-112h may be programmed to insert image data onto data bus 120 at a specified rate and using a specified blanking cut-offline 310 such that each sensor controller 112a-112h uses data bus 120 only during its allotted time within the frame capture cycle. Provided that sensor controllers 112a-112h are adequately synchronized, they may share data bus 120 in an organized manner without the need for a central controller. However, in other embodiments, data bus 120 may also include a clock signal, which individual sensor controllers 112 may use to determine when their allotted times begin and end for inserting image data onto the data bus.

Using the above-described technique, a sensor controller 112 may be customized to select different subsets of the image data collected by the sensor module 110 for insertion onto data bus 120, to insert data onto data bus at different rates or word sizes, or to insert data during different time allocations. For example, in other embodiments, a sensor controller 112 may discard more or less of image 300 (e.g., using one or more different blanking lines 310, vertical and/or horizontal), may insert image data during a 1.66 millisecond time allotment (e.g., representing a video rate of 60 fps), or may insert data at a faster rate (e.g., corresponding to a faster data bus speed, a larger data bus word size, and/or a larger resolution of composite image 400).

In this manner, sensor modules 110a-110h may be constructed using commercially available commodity hardware, yet their use may be modified as needed by programming sensor controllers 112a-112h. As described above, sensor controllers may be, for example, FPGAs, ASICs, or CPUs. In the case of FGPAs, modifying the behavior of a sensor controller may involve reprogramming the FGPA. In the case of ASICs, modifying the behavior of the sensor controller may involve replacing an existing ASIC with a different ASIC. In the case of CPUs, modifying the behavior of the sensor controller may involve storing different instructions in a program memory component used by the CPU to execute the above-described control functions.

In some embodiments, sensor modules 110a-110h may be positioned within vehicle 200 such that their fields of view are substantially adjacent. And, as a result, composite image 400 may arranged to position image data from adjacent fields of view in adjacent regions, such that the adjacent regions mimic a combined and substantially continuous field of view. For example, as depicted in FIG. 4, regions 410a and 410b, are positioned next to each other to form a combined region 420. Because regions 410a and 410b represent image data captured from adjacent sensor modules 110a and 110b, combined region 420 visually mimics a continuous field of view of the front, driver-side portion of the interior of vehicle 200. In some embodiments, if adjacent sensor modules 110 have overlapping fields of view, one or more sensor controllers 112 may be configured to exclude portions of the captured image data from being inserted onto bus 120 (e.g., by imposing one or more vertical cut-off lines 310) to ensure that one or more combined regions 420 depict substantially continuous and non-overlapping combined fields of view.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

What is claimed is:

1. A synchronized video monitoring system configured to capture a plurality of composite video image frames at a specified frames-per-second rate, the synchronized video monitoring system comprising:
   a data bus;
   a plurality of sensor modules connected to the data bus, wherein each sensor module in the plurality of sensor modules is positioned at a different physical location within a monitored area, wherein each sensor module comprises;
   a lens assembly;
   an image sensor; and
   a sensor controller, wherein the sensor controller is configured to perform operations comprising:
      capturing, using the lens assembly and the image sensor, image data representing an image of a field of view associated with the physical location at which the sensor nodule is positioned; and
      inserting the image data onto the data bus during a distinct, non-overlapping subset of time allocated to the sensor module within a frame capture cycle;
   a collection module connected to the data bus, wherein the collection module comprises a digital image compression engine, and wherein the collection module is configured to perform operations comprising:
      retrieving, from the data bus, the image data inserted by each sensor controller during the frame capture cycle;
      inserting the image data received from each sensor controller into a distinct, non overlapping region of a composite image;
      compressing and encoding the composite image, using the digital image compression engine, to generate a composite video image frame; and
      outputting the composite video image frame, wherein the outputting comprises one or more of:
         storing the composite video image frame in a computer-readable medium; and
         transmitting the composite video image frame for display on a display screen.

2. The synchronized video monitoring system of claim 1, wherein each sensor controller is further configured to perform operations comprising:
   inserting a subset of the image data onto the data bus luring the distinct, non-overlapping subset of time.

3. The synchronized video monitoring system of claim 2, wherein the subset of the image data is selected from the image data based on an amount of data that may be inserted onto the data bus by the sensor controller during the distinct, non-overlapping subset of time.

4. The synchronized video monitoring system of claim 2, wherein the subset of the image data is selected from the image data based on dimensions of a region within the composite image into which the image data will be inserted by the collection module.

5. The synchronized video monitoring system of claim 1, wherein each sensor module is allocated a substantially commensurate distinct, non-overlapping subset of time.

6. The synchronized video monitoring system of claim 5, wherein each distinct, non-overlapping region of the composite image is substantially commensurate in dimensions.

7. The synchronized video monitoring system of claim 1, wherein the composite image includes two or more distinct, non-overlapping and adjacent regions containing image data from two or more sensor modules occupying adjacent physical locations within the monitored area, such that a combined region comprising the two or more distinct, non overlapping and adjacent regions depicts a substantially continuous field of view of a portion of the monitored area between the two or more fields of view associated with the two or more sensor modules.

8. The synchronized video monitoring system of claim 7, wherein the sensor controller in at least one sensor module in the plurality of sensor modules is further configured to perform operations comprising:
   excluding a subset of the image data from being inserted onto the data bus during the distinct, non-overlapping subset of time, wherein the subset of the image data represents a portion of the field of view of the sensor module that overlaps with a portion of the field of view of an adjacent sensor module.

9. The synchronized video monitoring system of claim 1, wherein the data bus, the plurality of sensor modules, and the collection module are installed on a movable platform.

10. The synchronized video monitoring system of claim 9, wherein:
   the movable platform is an automobile; and
   the monitored area comprises an interior of the automobile.

11. A method of capturing a plurality of composite video image frames at a specified frames-per-second rate using a synchronized video monitoring system, the method comprising:
   using a plurality of sensor modules connected to a data bus to capture image data, wherein;
      each sensor module comprises a lens assembly, an image sensor, and a sensor controller;
      each sensor module in the plurality of sensor modules is positioned at a different physical location within a monitored area; and
      capturing the image data comprises each sensor module performing operations comprising:
         capturing, using the lens assembly and the image sensor, image data representing an image of a field of view associated with the physical location at which the sensor module is positioned; and
         inserting the image data onto the data bus during a distinct, non-overlapping subset of time allocated to the sensor module within a frame capture cycle;
   using a collection module connected to the data bus to generate a composite video image frame from the image data, wherein:
      the collection module comprises a digital image compression engine; and
      generating the composite video image frame comprises:
         retrieving, from the data bus, the image data inserted by each sensor module during the frame capture cycle;
         inserting the image data received from each sensor module into a distinct, non-overlapping region of a composite image;
         compressing and encoding the composite image, using the digital image compression engine, to generate a composite video image frame; and
         outputting the composite video image frame, wherein the outputting comprises one or more of:
            storing the composite video image frame in a computer-readable medium; and
            transmitting the composite video image frame for display on a display screen.

12. The method of claim 11, wherein each sensor module further performs operations comprising:
   inserting a subset of the image data onto the data bus during the distinct, non-overlapping subset of time.

13. The method of claim 12, wherein the subset of the image data is selected from the image data based on an amount of data that may be inserted onto the data bus by the sensor controller during the distinct, non-overlapping subset of time.

14. The method of claim 12, wherein the subset of the image data is selected from the image data based on dimensions of a region within the composite image into which the image data will be inserted by the collection module.

15. The method of claim 11, wherein each sensor module is allocated a substantially commensurate distinct, non-overlapping subset of time.

16. The method of claim 15, wherein each distinct, non-overlapping region of the composite image is substantially commensurate in dimensions.

17. The method of claim 11, wherein the composite image includes two or more distinct, non-overlapping and adjacent regions containing image data from two or more sensor modules occupying adjacent physical locations within the monitored area, such that a combined region comprising the two or more distinct, non-overlapping and adjacent regions depicts a substantially continuous field of view of a portion of the monitored area between the two or more fields of view associated with the two or more sensor modules.

18. The method of claim 17, wherein one or more sensor modules further performs operations comprising:
   excluding a subset of the image data from being inserted onto the data bus during the distinct, non-overlapping subset of time wherein the subset of the image data represents a portion of the field of view of the sensor module that overlaps with a portion of the field of view of an adjacent sensor module.

19. The method of claim 11, wherein the data bus, the plurality of sensor modules, and the collection module are installed on a movable platform.

20. The method of claim 19, wherein;
   the movable platform is an automobile; and
   the monitored area comprises an interior of the automobile.

* * * * *